United States Patent [19]

Lin

[11] 3,821,219

[45] June 28, 1974

[54] TRIAZINONES

[75] Inventor: Kang Lin, Newark, Del.

[73] Assignee: E. I. du Pont de Nemours and Company, Wilmington, Del.

[22] Filed: Sept. 15, 1972

[21] Appl. No.: 289,458

[52] U.S. Cl. ............................ 260/248 NS, 7.1/93
[51] Int. Cl. .......................................... C07d 55/50
[58] Field of Search ............................. 260/248 NS

[56] References Cited

UNITED STATES PATENTS 2,016,521   10/1935   Steindorff et al. ............. 260/248 X

*Primary Examiner*—John M. Ford

[57] ABSTRACT

Certain triazinones are excellent selective herbicides that can be used both preemergence and postemergence in the presence of wheat, barley, and rye. These herbicides are very effective against wild oats.

4 Claims, No Drawings

TRIAZINONES

BACKGROUND OF THE INVENTION

This invention relates to novel compositions and methods employing certain triazinones as selective herbicides, that can be used in the presence of wheat, barley and rye.

German Pat. publication No. 1,962,797, open to public inspection July 30, 1970, discloses a class of herbicidal dihydrotriazine derivatives having the general formula (1)

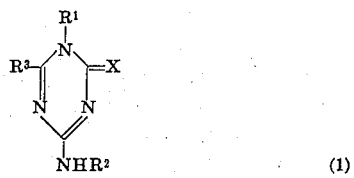

(1)

wherein $R^1$ is a $C_1$–$C_5$ alkyl; $R^2$ is a $C_1$–$C_{14}$ alkyl; $R^3$ is hydrogen, methyl, or ethyl; and X is oxygen or sulfur.

These compounds can be, according to the above German publication, prepared by aminolysis of the corresponding 4-benzylthiotriazinones or 4-methylthiotriazinethiones, as shown in the following equation:

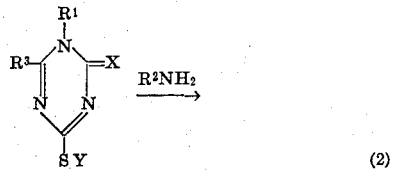

(2)

wherein Y is methyl when X is sulfur, but Y is benzyl when X is oxygen.

The German publication does not suggest that either the benzylthio intermediate or any other intermediate described therein has any herbicidal properties.

Other triazine herbicides are well known in the art, for example, Atrazine - 2-chloro-4-ethylamino-6-isopropylamino-s-triazine - and Simazine - 2-chloro-4,6-di(ethylamino)-s-triazine.

Very few potent herbicides can be used in the presence of certain valuable crops, for example, wheat. Other herbicides do not effectively control certain weeds that often are present in crop fields, for example, wild oats. A good, selective herbicide that can effectively control undesirable vegetation in the presence of valuable crops such as wheat is, therefore, very desirable.

SUMMARY OF THE INVENTION

According to this invention, it has now been discovered that a class of triazinones represented by the following formula (3) are excellent selective herbicides which are safe to wheat, barley, and rye but very well control such hard-to-kill weeds as, for example, wild oats:

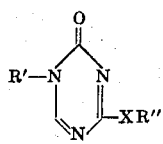

(3)

wherein X is oxygen or sulfur; R′ is a $C_2$–$C_6$ alkyl, a $C_3$–$C_6$ cycloalkyl, allyl, or propargyl; and R″ is a $C_1$–$C_3$ alkyl, allyl, or propargyl.

DETAILED DESCRIPTION OF THE INVENTION

The compounds of this invention are all members of the class of s-triazine-2(1H)-ones. For example, the compound having formula (3) in which R′ is isopropyl; R″ is methyl; and X is sulfur is named 1-isopropyl-4-methylthio-s-triazine-2(1H)-one.

The preferred, and the most active, compounds of the present invention are those compounds having formula (3), above, in which X is sulfur; R′ is a $C_3$–$C_4$ alkyl; and R″ is methyl.

The compounds of the present invention can be made, for example, by the process which involves the following reactions:

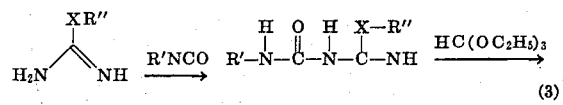

(3)

The first step in this synthesis, the preparation of allophanimidates and thioallophanimidates from a pseudourea or thiopseudourea and an isocyanate, can follow the procedure of Organic Synthesis 42, 87, which describes the preparation of methyl-4-phenyl-3-thioallophanimidate. The product is then heated with an excess of triethyl orthoformate in the presence of an acid catalyst, for example, a strong cation exchange resin in acid form. Ethanol is removed by distillation, and the cyclized product is obtained. The final product can be isolated by any conventional means. For example, when an ion exchange resin is used as the reaction catalyst, the resin is filtered off, and the filtrate is diluted with hexane or another suitable hydrocarbon. The s-triazine-2(1H)-ones of this invention usually separate as crystalline solids, which can be further purified by recrystallization from an organic solvent, for example, chlorobutane.

The synthesis of certain preferred compounds of the present invention is illustrated by the following representative examples, wherein all parts, proportions, and percentages are by weight unless indicated otherwise.

EXAMPLE 1

1-Isopropyl-4-methylthio-s-triazine-2(1H)-one

To 138 parts of 2-methylthiopseudourea sulfate in 500 parts of water at 0°–10°C. is added dropwise 80 parts of 50 percent sodium hydroxide. One thousand parts of acetone is added, followed by 85 parts of isopropyl isocyanate. The reaction mixture is allowed to warm to room temperature in 2 hours. The acetone is evaporated on a rotary evaporator, and the solid is collected and dried to give 150 parts of methyl 4-isopropylthioallophanimidate, m.p. 81°–85°C.

A solution of 20 parts of the above compound, 1 part of a sulfonated ion exchange resin in acid form, and 80 parts of triethyl orthoformate is heated with slow removal of ethanol by distillation. The solution is filtered and an equal volume of hexane is added to the filtrate. Eight parts of 1-isopropyl-4-methylthio-s-triazine-2(1H)-one is collected, m.p. 126°–128°C.

In the same manner, using the appropriate pseudourea or thiopseudourea and the appropriate isocyanate, the following additional compounds having the above formula (3) are prepared:

1-sec-butyl-4-methylthio-s-triazine-2(1H)-one, m.p.81°–82.5°C.

1-cyclohexyl-4-methylthio-s-triazine-2(1H)-one, m.p. 151°–153°C.

1-ethyl-4-methylthio-s-triazine-2(1H)-one, m.p. 103°–105°C.

1-isopropyl-4-methoxy-s-triazine-2(1H)-one, m.p. 146°–149°C.

1-isopropyl-4-ethylthio-s-triazine-2(1H)-one, m.p. 111°–113°C.

1-butyl-4-methylthio-s-triazine-2(1H)-one, m.p. 88°–90°C.

1-ethyl-4-methoxy-s-triazine-2(1H)-one
1-ethyl-4-propylthio-s-triazine-2(1H)-one
1-ethyl-4-propoxy-s-triazine-2(1H)-one
1-ethyl-4-allylthio-s-triazine-2(1H)-one
1-ethyl-4-alloxy-s-triazine-2(1H)-one
1-ethyl-4-propargylthio-s-triazine-2(1H)-one
1-ethyl-4-propargoxy-s-triazine-2(1H)-one
1-hexyl-4-methylthio-s-triazine-2(1H)-one
1-hexyl-4-methoxy-s-triazine-2(1H)-one
1-hexyl-4-propylthio-s-triazine-2(1H)-one
1-hexyl-4-propoxy-s-triazine-2(1H)-one
1-hexyl-4-allylthio-s-triazine-2(1H)-one
1-hexyl-4-alloxy-s-triazine-2(1H)-one
1-hexyl-4-propargylthio-s-triazine-2(1H)-one
1-hexyl-4-propargoxy-s-triazine-2(1H)-one
1-cyclopropyl-4-methylthio-s-triazine-2(1H)-one
1-cyclopropyl-4-methoxy-s-triazine-2(1H)-one
1-cyclopropyl-4-propylthio-s-triazine-2(1H)-one
1-cyclopropyl-4-propoxy-s-triazine-2(1H)-one
1-cyclopropyl-4-allylthio-s-triazine-2(1H)-one
1-cyclopropyl-4-alloxy-s-triazine-2(1H)-one
1-cyclopropyl-4-propargylthio-s-triazine-2(1H)-one
1-cyclopropyl-4-propargoxy-s-triazine-2(1H)-one
1-cyclohexyl-4-methoxy-s-triazine-2(1H)-one
1-cyclohexyl-4-propylthio-s-triazine-2(1H)-one
1-cyclohexyl-4-propoxy-s-triazine-2(1H)-one
1-cyclohexyl-4-allylthio-s-triazine-2(1H)-one
1-cyclohexyl-4-alloxy-s-triazine-2(1H)-one
1-cyclohexyl-4-propargylthio-s-triazine-2(1H)-one
1-cyclohexyl-4-propargoxy-s-triazine-2(1H)-one
1-allyl-4-methylthio-s-triazine-2(1H)-one
1-allyl-4-methoxy-s-triazine-2(1H)-one
1-allyl-4-propylthio-s-triazine-2(1H)-one
1-allyl-4-propoxy-s-triazine-2(1H)-one
1-allyl-4-allylthio-s-triazine-2(1H)-one
1-allyl-4-alloxy-s-triazine-2(1H)-one
1-allyl-4-propargylthio-s-triazine-2(1H)-one
1-allyl-4-propargoxy-s-triazine-2(1H)-one
1-propargyl-4-methylthio-s-triazine-2(1H)-one
1-propargyl-4-methoxy-s-triazine-2(1H)-one
1-propargyl-4-propylthio-s-triazine-2(1H)-one
1-propargyl-4-propoxy-s-triazine-2(1H)-one
1-propargyl-4-allylthio-s-triazine-2(1H)-one
1-propargyl-4-alloxy-s-triazine-2(1H)-one
1-propargyl-4-propargylthio-s-triazine-2(1H)-one
1-propargyl-4-propargoxy-s-triazine-2(1H)-one The compounds of the invention are selective herbicides for the control of wild oats (*Avena fatua* L.), a very serious weed problem in several cereal crops, such as wheat, barley, and rye. The compounds can be safely applied either preemergence to wild oats and/or crop or early postemergence to five leaf stage to wild oats and/or crop. In either case, wild oats are controlled and the crop gives excellent yields. The compounds can be applied at a rate from about one-fourth kg. of active ingredient per hectare to about 10 kg. of active ingredient per hectare as a wettable powder suspension in 50 liters or more of water. The herbicidal activity may be enhanced by the addition of commercially available spraying adjuvants.

The herbicidal activity of the s-triazine-2(1H)-ones of the present invention can be evaluated in greenhouse tests, which are conducted as described below.

PREEMERGENCE TESTS

1-Isopropyl-4-methylthio-s-triazine-2(1H)-one was applied in a nonphytotoxic solvent to pots of wheat (*Triticum* Sp. L.) and wild oats (*Avena fatua*) seeds planted in soil. Pots of barley and rye seeds planted in soil were included in the fourth test. After three to 4 weeks in a greenhouse, plant response ratings were taken: 0 means no effect; 10 means maximum response; C stands for chlorosis-necrosis, B stands for burn; and G stands for growth retardation.

|  | Kg/Ha Active Ingredient | Wild Oats | Wheat | Barley | Rye |
| --- | --- | --- | --- | --- | --- |
| 1st Test | 2.2 | 9C | 0 | | |
| 2nd Test | 1.1 | 9C | 3C | | |
| | 0.55 | 9C | 0 | | |
| 3rd Test | 4.4 | 9C | 0 | | |
| | 1.1 | 9C | 0 | | |
| | 0.55 | 7C | 0 | | |
| | 0.27 | 0 | 0 | | |
| 4th Test | 4.4 | 10C | 0 | 0 | 2C |
| | 2.2 | 10C | 0 | 0 | 2C |
| | 1.1 | 9C | 0 | 0 | 2C |

POSTEMERGENCE TESTS

Wheat and wild oat seeds were planted in soil contained in greenhouse pots. After 1 week, the wheat and wild oat plants were sprayed with 1-isopropyl-4-methylthio-s-triazine-2(1H)-one containing a solvent, wetting agent, and humectants. After 3 weeks in a greenhouse, plant response ratings were taken, as explained above.

|  | Kg/Ha Active Ingredient | Wild Oats | Wheat |
| --- | --- | --- | --- |
| 1st Test | 2.2 | 10B | 1G |
| 2nd Test | 1.1 | 7C | 0 |
| | 0.55 | 1C | 0 |
| 3rd Test | 4.4 | 9B | 0 |
| | 1.1 | 9B | 0 |
| | 0.55 | 3B | 0 |
| | 0.27 | 0 | 0 |

The above results show that the compounds of the present invention are effective wild oats herbicides at the low rates of 2.2 lbs. per acre or less, whether applied preemergence or postemergence.

Useful formulations of the compounds of formula (3) can be prepared in conventional ways. They include dusts, granules, pellets, solutions, suspensions, emulsions, wettable powders, emulsifiable concentrates and the like. Many of these may be applied directly. Sprayable formulations can be extended in suitable media and used at spray volumes of from a few pints to several hundred gallons per acre. High strength compositions are primarily used as intermediates for further formulation. The formulations, broadly, contain about 1 to 99 percent by weight of active ingredient(s) and at least one of (a) about 0.1 to 20 percent surfactant(s), and (b) about 5 to 99 percent solid or liquid diluent(s). More specifically, they will contain these ingredients in the following approximate proportions: proportions:

|  | Percent by Weight | | |
| --- | --- | --- | --- |
|  | Active Ingredient | Diluent(s) | Surfactant(s) |
| Wettable Powders | 20–90 | 0–74 | 1–10 |
| Oil Suspensions, Emulsions, Solutions (including Emulsifiable Concentrates) | 5–50 | 40–95 | 0–15 |
| Aqueous Suspensions | 10–50 | 40–84 | 1–20 |
| Dusts | 1–25 | 70–99 | 0–5 |
| Granules and Pellets | 1–95 | 5–99 | 0–15 |
| High Strength Compositions | 90–99 | 0–10 | 0–2 |

Lower or higher levels of active ingredient can, of course, be present depending, for example, on the physical properties of the compound. Higher ratios of surfactant to active ingredient are sometimes desirable, and are achieved by incorporation into the formulation or by tank mixing.

Typical solid diluents are described in Watkins et al., "Handbook of Insecticide Dust Diluents and Carriers", 2nd Edn., Dorland Books, Caldwell, N.J. The more absorptive diluents are preferred for wettable powders and the denser ones for dusts. Typical liquid diluents and solvents are described in Marsden, "Solvents Guide", 2nd Edn., Interscience, New York, 1950. Solubility under 0.1 percent is preferred for suspension concentrates; solution concentrates are preferably stable against phase separation at 0°C. "McCutcheon's Detergents and Emulsifiers Annual," Allured Publ. Corp., Ridgewood, N.J., as well as Sisely and Wood, "Encyclopedia of Surface Active Agents," Chemical Publ. Co., Inc., New York, 1964, list surfactants and recommended uses. All formulations can contain minor amounts of additives to reduce foam, caking, corrosion, microbiological growth, etc.

The methods of making such compositions are well known. Solutions are prepared by simply mixing the ingredients. Fine solid compositions are made by blending and, usually, grinding as in a hammer or fluid energy mill. Suspensions are prepared by wet milling (see, for example, Littler, U.S. Pat. No. 3,060,084). Granules and pellets may be made by spraying the active material upon preformed granular carriers or by agglomeration techniques. See J. E. Browning, "Agglomeration", *Chemical Engineering*, Dec. 4, 1967, pp. 147FF, and "Perry's Chemical Engineer's Handbook", 4th Edn., McGraw-Hill, N.Y., 1963, pp. 8–59FF.

For further information regarding the art of formulation, see for example:

R. W. Luckenbaugh, U.S. Pat. No. 3,309,192 Mar. 14, 1967, Col. 5, line 43 through Col. 7, line 62.

H. M. Loux, U.S. Pat. No. 3,235,361 Feb. 15, 1966, Col. 6, line 5 through Col. 7, line 19, and Examples 10 through 41.

H. Gysin and E. Knüsli, U.S. Pat. No. 2,891,855, June 23, 1959, Col. 3, line 66 through Col. 5, line 17.

G. C. Klingman, "Weed Control As A Science", John Wiley & Sons, Inc., New York, 1961, pp. 81–96.

J. D. Fryer and S. A. Evans, "Weed Control Handbook", 5th Edn., Blackwell Scientific Publications, Oxford, 1968, pp. 101–103.

Typical suitable formulations are shown below. All percentages are by weight.

| A. Wettable Powder | |
| --- | --- |
| 1-isopropyl-4-methylthio-s-triazine-2(1H)-one | 40% |
| dioctyl sodium sulfosuccinate | 1.5% |
| sodium ligninsulfonate | 3% |
| low viscosity methyl cellulose | 1.5% |
| attapulgite | 54% |

The ingredients are thoroughly blended; passed through an air mill to produce an average particle size under 15 microns, reblended, and sifted through a U.S.S. No. 50 sieve (0.3 mm opening) before packaging.

| B. Aqueous Suspension | |
| --- | --- |
| 1-isopropyl-4-ethylthio-s-triazine-2(1H)-one | 25% |
| hydrated attapulgite | 3% |
| crude calcium ligninsulfonate | 10% |
| sodium dihydrogen phosphate | 0.5% |
| water | 61.5% |

The ingredients are ground together in a ball or roller mill until the solid particles have been reduced to diameters under 10 microns.

| C. Extruded Pellet | |
| --- | --- |
| 1-sec-butyl-4-methylthio-s-triazine-2(1H)-one | 25% |
| anhydrous sodium sulfate | 10% |
| crude calcium ligninsulfonate | 5% |
| sodium alkylnaphthalenesulfonate | 1% |
| calcium/magnesium bentonite | 59% |

The ingredients are blended, hammer milled and then moistened with about 12 percent water. The mixture is extruded as cylinders about 3 mm diameter which are cut to produce pellets about 3 mm long. These may be used directly after drying, or the dried pellets may be crushed to pass a U.S.S. No. 20 sieve (0.84 mm openings). The granules held on a U.S.S. No. 40 sieve (0.42 mm openings) may be packaged for use and the fines recycled.

In the following composition claims, the term "consisting essentially of" means that in addition to the specifically recited components the composition may also contain other components, provided they do not adversely affect the operability of the composition for its intended use.

I claim:

1. A compound having the following formula

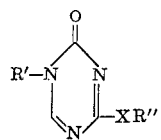

wherein X is oxygen or sulfur; R' is a $C_2$–$C_6$ alkyl, a $C_3$–$C_6$ cycloalkyl, allyl, or propargyl; and R'' is a $C_1$–$C_3$ alkyl, allyl, or propargyl.

2. The compound of claim 1 wherein R' is isopropyl; X is sulfur; and R'' is methyl.

3. The compound of claim 1 wherein R' is isopropyl; X is sulfur; and R'' is ethyl.

4. The compound of claim 1 wherein R' is sec-butyl; X is sulfur; and R'' is methyl.